United States Patent
Symoën et al.

(10) Patent No.: US 9,092,971 B2
(45) Date of Patent: Jul. 28, 2015

(54) METHOD FOR CONTROLLING A GROUP OF WIRELESSLY CONTROLLED APPLIANCES

(75) Inventors: Lionel Symoën, La Roche sur Foron (FR); Rémi Sourain, Domancy (FR)

(73) Assignee: Somfy S.A.S., Cluses (FR)

(*) Notice: Subject to any disclaimer, the term of this patent is extended or adjusted under 35 U.S.C. 154(b) by 879 days.

(21) Appl. No.: 12/498,667

(22) Filed: Jul. 7, 2009

(65) Prior Publication Data

US 2010/0013609 A1    Jan. 21, 2010

(30) Foreign Application Priority Data

Jul. 21, 2008   (EP) ..................................... 08290710

(51) Int. Cl.
  *G05B 1/01*    (2006.01)
  *G08C 17/02*   (2006.01)
  *H04L 12/28*   (2006.01)

(52) U.S. Cl.
  CPC ............ *G08C 17/02* (2013.01); *G08C 2201/10* (2013.01); *G08C 2201/40* (2013.01); *H04L 12/2803* (2013.01); *H04L 2012/2841* (2013.01)

(58) Field of Classification Search
  CPC ...... H05B 39/086; Y02B 60/50; Y02B 20/42; Y02B 20/44; Y02B 60/1289; Y02B 70/16; Y02B 90/224; Y02B 60/1282; Y10S 323/904; G06F 1/3203; G06F 1/3209; G06F 1/266; G06F 11/1417; G06F 1/3228; G06F 9/4401; H01H 2300/022; H04N 21/443; H04N 21/4432; H04N 21/4436
  See application file for complete search history.

(56) References Cited

U.S. PATENT DOCUMENTS

| | | | |
|---|---|---|---|
| 5,051,720 A * | 9/1991 | Kittirutsunetorn | 340/12.33 |
| 5,406,439 A * | 4/1995 | Crane et al. | 361/152 |
| 5,488,357 A * | 1/1996 | Sato et al. | 340/12.31 |
| 5,596,628 A * | 1/1997 | Klein | 379/93.11 |

(Continued)

FOREIGN PATENT DOCUMENTS

| | | |
|---|---|---|
| GB | 2 436 979 A | 10/2007 |
| GB | 2 439 763 A | 1/2008 |

(Continued)

OTHER PUBLICATIONS

Han, Jinsoo et al.: "Service-Oriented Power Management for an Integrated Multi-Function Home Server", *IEEE Transactions on Consumer Electronics*, vol. 53, No. 1, Feb. 2007, pp. 204-208.

(Continued)

*Primary Examiner* — Daniell L Negron
*Assistant Examiner* — John Bamert
(74) *Attorney, Agent, or Firm* — Frommer Lawrence & Haug LLP; Ronald R. Santucci

(57) ABSTRACT

A method for controlling a group of wirelessly controlled appliances comprising at least one appliance in a home automation network comprising a master controller, characterized in that it comprises:
  a reception step in which the master controller receives a wireless command intended for an appliance of the group, then
  a connection step in which the master controller connects the appliance to mains power, if the appliance was previously disconnected from the mains power, then
  a disconnection step in which the appliance is automatically disconnected from mains power.

13 Claims, 5 Drawing Sheets

(56) References Cited

U.S. PATENT DOCUMENTS

Figure 1A:
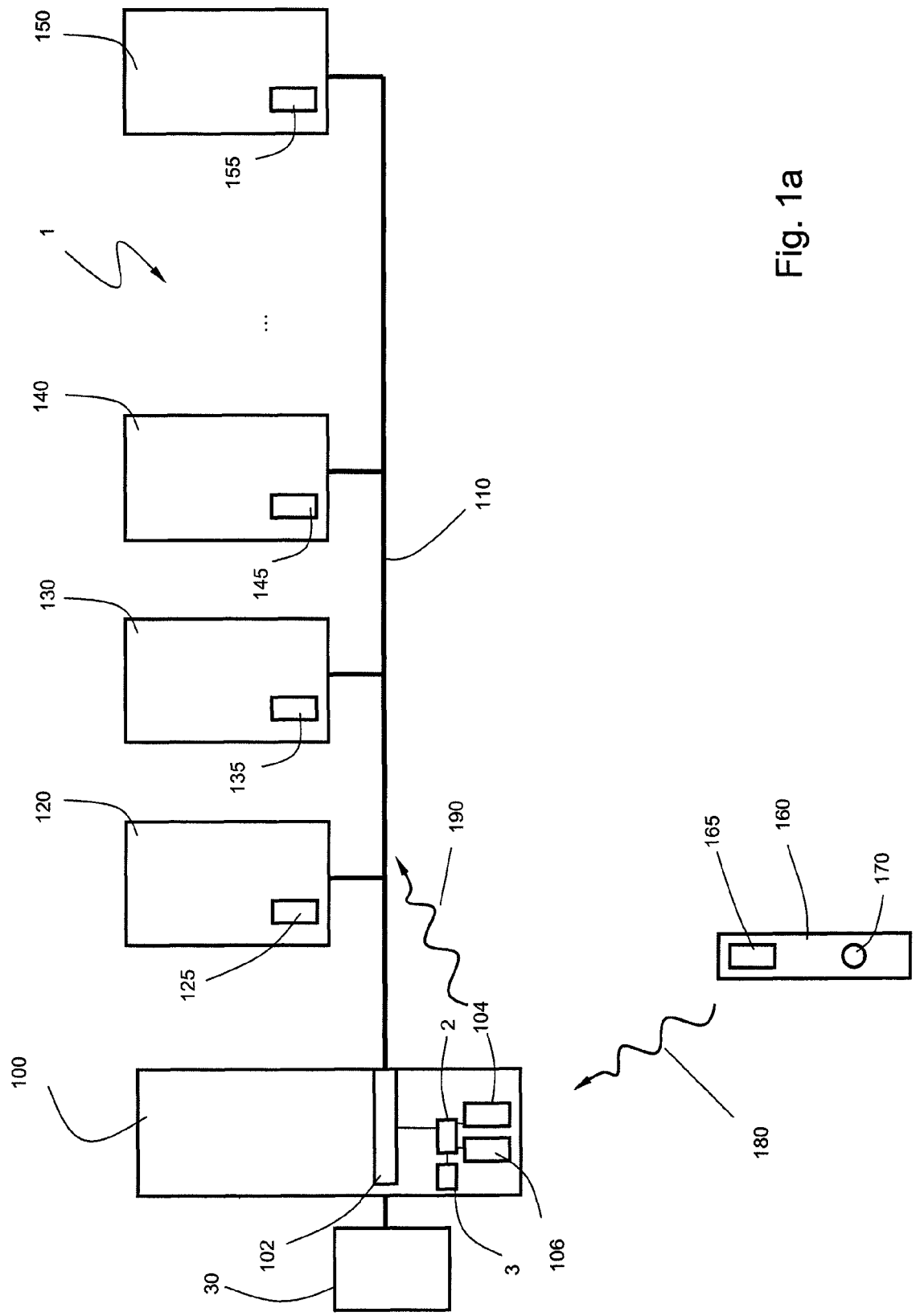

| | | | |
|---|---|---|---|
| 5,721,583 A * | 2/1998 | Harada et al. | 725/24 |
| 5,721,659 A * | 2/1998 | Young | 361/111 |
| 5,962,992 A * | 10/1999 | Huang et al. | 315/312 |
| 6,107,698 A * | 8/2000 | Ochiai et al. | 307/43 |
| 6,297,746 B1 * | 10/2001 | Nakazawa et al. | 340/12.5 |
| 6,642,852 B2 * | 11/2003 | Dresti et al. | 340/12.24 |
| 6,700,493 B1 * | 3/2004 | Robinson | 340/573.1 |
| 6,792,323 B2 * | 9/2004 | Krzyzanowski et al. | 700/90 |
| 7,190,125 B2 * | 3/2007 | McDonough et al. | 315/291 |
| 7,526,593 B2 * | 4/2009 | Mandal et al. | 710/310 |
| 8,427,589 B2 * | 4/2013 | Fratti | 348/738 |
| 2006/0232221 A1 * | 10/2006 | Kawai | 315/209 R |
| 2007/0142091 A1 * | 6/2007 | Gasborro et al. | 455/566 |
| 2007/0297112 A1 | 12/2007 | Gilbert | |
| 2008/0172504 A1 * | 7/2008 | Kimura et al. | 710/63 |
| 2009/0195349 A1 * | 8/2009 | Frader-Thompson et al. | 340/3.1 |
| 2009/0274087 A1 * | 11/2009 | Schoettle | 370/315 |

FOREIGN PATENT DOCUMENTS

| | | |
|---|---|---|
| WO | WO 03/077475 A | 9/2003 |
| WO | WO 2007/027063 A | 3/2007 |

OTHER PUBLICATIONS

Heo, Joon et al.: "Design and Implementation of Control Mechanism for Standby Power Reduction", *IEEE Transactions on Consumer Electronics*, vol. 54, No. 1, Feb. 2008, pp. 179-185.

Mozar, Stefan: "Intelligent Standby Concept", *IEEE Transactions on Consumer Electronics*, vol. 46, No. 1, Feb. 2000, pp. 179-182.

European Search Report for priority European application 08290710.6 dated Feb. 23, 2009.

* cited by examiner

METHOD FOR CONTROLLING A GROUP OF WIRELESSLY CONTROLLED APPLIANCES

This application claims priority benefits from European Patent Application No. 08290710.6 filed Jul. 21, 2008, the disclosure of which is hereby incorporated by reference.

The invention relates to a method for wireless control of a plurality of appliances with reduced stand-by power loss. The invention also relates to a method for operating a master controller controlling a group of wirelessly controlled appliances. The invention also relates to a master controller for implementing such methods. The invention also relates to a home automation network having such a master controller. The invention also relates to a method for configuring a home automation network or a master controller.

Wireless control of appliances enhances user comfort and often reduces cabling needs. However, in order to be able to listen to wireless commands at all times, wirelessly controlled appliances need to be supplied with power in a constant manner, which causes stand-by power losses.

Several methods to reduce these losses are known. For example US2007/0297112 describes a specific power-saving connection block for a group of appliances. As the different appliances of the group are plugged in the connection block, their connection to power can be switched off completely at once. Means for reinstating power to the appliances include remote control means, such as radio or Infrared wireless commands, sound detection and the like. This device requires that a user first reinstate the power before being able to use the different appliances.

In a similar way, WO2007/27063 describes a power-saving plug for electrical appliances. Power to the appliances is automatically cut after a predetermined timed has passed while the appliances are in a stand-by state. Although it is clear from this patent application when the appliances should be switched off, it does not give any solution for a user to be able to control the appliances at all times.

Alternatively, another solution to reduce energy consumption in an in-home network is described in patent application WO03/677475. A central controller receives and stores messages that are dedicated to a specific appliance of the in-home network in a switched-off state until power is reinstated to the appliance, in which case the messages are transmitted. This network does not provide either a solution to control the appliances at all times according to a user wishes.

The aim of the invention is to provide a method obviating the above-mentioned drawbacks and improving the known methods. Particularly, the invention permits to reduce stand-by power losses of a plurality of wirelessly controlled appliances, while authorizing a control of the appliances at all times. The invention is especially well suited for appliances that are connected to mains power and whose operation time is significantly shorter than their time in stand-by mode. In particular, the invention is particularly well adapted for a home automation network with RF-controlled appliances, such as actuators for solar protection devices, windows, doors, gates, or the like. It is especially advantageous, that existing RF-controlled appliances can be used and that the stand-by losses can be reduced by adding a master controller to a plurality of appliances. Moreover, the invention permits to reduce stand-by power losses of a single wirelessly controlled appliance, this appliance using a stand-by power mode, which consumes more power than the master controller according to the invention. Thus, the invention permits to adapt old appliances to the today consumption requirements.

The method according to the invention is defined by independent claim 1.

Various embodiments of the method are defined by dependent claims 2 to 10.

The master controller according to the invention is defined by independent claim 11.

Embodiments of the master controller are defined by dependent claim 12 and 13.

The home automation network according to the invention is defined by claim 14.

The configuring method according to the invention is defined by independent claim 15.

The appended drawing represents, by way of examples, two embodiments of a home automation network according to the invention and an embodiment of a method for controlling appliances according to the invention.

FIG. 1a: Schematic drawing of a first embodiment of a home automation network permitting a wireless control of a plurality of appliances with reduced stand-by power loss according to the invention, FIG. 1b: Schematic drawing of a second embodiment of a home automation network permitting a wireless control of a plurality of appliances with reduced stand-by power loss according to the invention, FIG. 2: Flow diagram of an embodiment of the method for wireless control of a plurality of appliances with reduced stand-by power loss according to the invention, FIG. 3: Flow diagram of an embodiment of the configuration method of the network according to the invention, FIG. 4: Schematic representation of a wireless command.

The method for wireless control of one or a plurality of appliances with reduced stand-by power loss makes the use of a master controller, which can connect and disconnect the appliance(s) from mains power and which can receive and repeat wireless commands aimed for one or a plurality of the appliances. In stand-by mode, the master controller disconnects all associated appliances from mains power and reduces their stand-by losses to zero.

A wireless command for one or a plurality of the appliances may be transmitted based on the actuation of a remote control or an automated controller. The command is received and eventually recorded in a memory such as a buffer memory by the master controller, which evaluates the command, provides power to at least the relevant appliance(s), and when necessary, re-transmits the command in a modified or unchanged form. This re-transmitted command is received by the relevant appliance(s), which evaluate(s) and execute(s) the command. After a period of time long enough for the execution of the command, the master controller cuts off the power supply to the (relevant) appliance(s) again.

The operating of the invention is explained based on a preferred embodiment. Other methods and systems within the scope of the invention can be imagined as well.

A first embodiment of a home automation network according to the invention is described below with reference to the schematic diagram of FIG. 1a.

The home automation network 1 comprises a plurality of appliances 120, 130, 140, 150. Each appliance contains at least a receiving means 125, 135, 145, 155 to receive wireless commands, such as an RF receiver. Each appliance is controlled by one or a plurality of wireless controls 160, such as remote controls or central controls. The wireless control 160 contains at least a means 165 for transmitting wireless commands. It may be advantageous, that the wireless control 160 also contains a means for manual activation 170 of wireless commands, e.g. push-buttons or the like.

The appliances are supplied with power from the mains power 30 network, through cables 110.

The home automation network also comprises hardware and software means to implement the methods according to the invention. The home automation network comprises a master controller 100 comprising hardware and software means to implement the methods according to the invention. The master controller 100 comprises at least a switching means 102 to open or close a connection between the cables 110 linked to the appliances and the mains power, a receiving means 104 to receive wireless commands, and a transmitting means 106 to transmit wireless commands (alternatively wired commands). Typical switching means to open or close a connection to mains power are cut-off relays or switches, but other means are thinkable as well. Switching means may include intensity measurement means for measuring the current drawn by the appliances. The master controller also comprises a logic-processing unit 2 controlling the switching means, the receiving means 104 and the transmitting means 106. The logic-processing unit 2 includes or is connected to a memory 3. The software means may comprise computer programs included in the logic processing unit.

The hardware and software means permit to implement all the steps required by the methods according to the invention.

By means of cables 110, the plurality of appliances is connected to the mains power network through the master controller 100 and in particular through the switching means of the master controller. The master controller thus controls the connection or disconnection of the appliances from the mains power.

A second embodiment of a home automation network according to the invention is described below with reference to the schematic diagram of FIG. 1*b*. The numbering used in FIG. 1*a* is kept in FIG. 1*b*, with an added '.

Figure 1B:
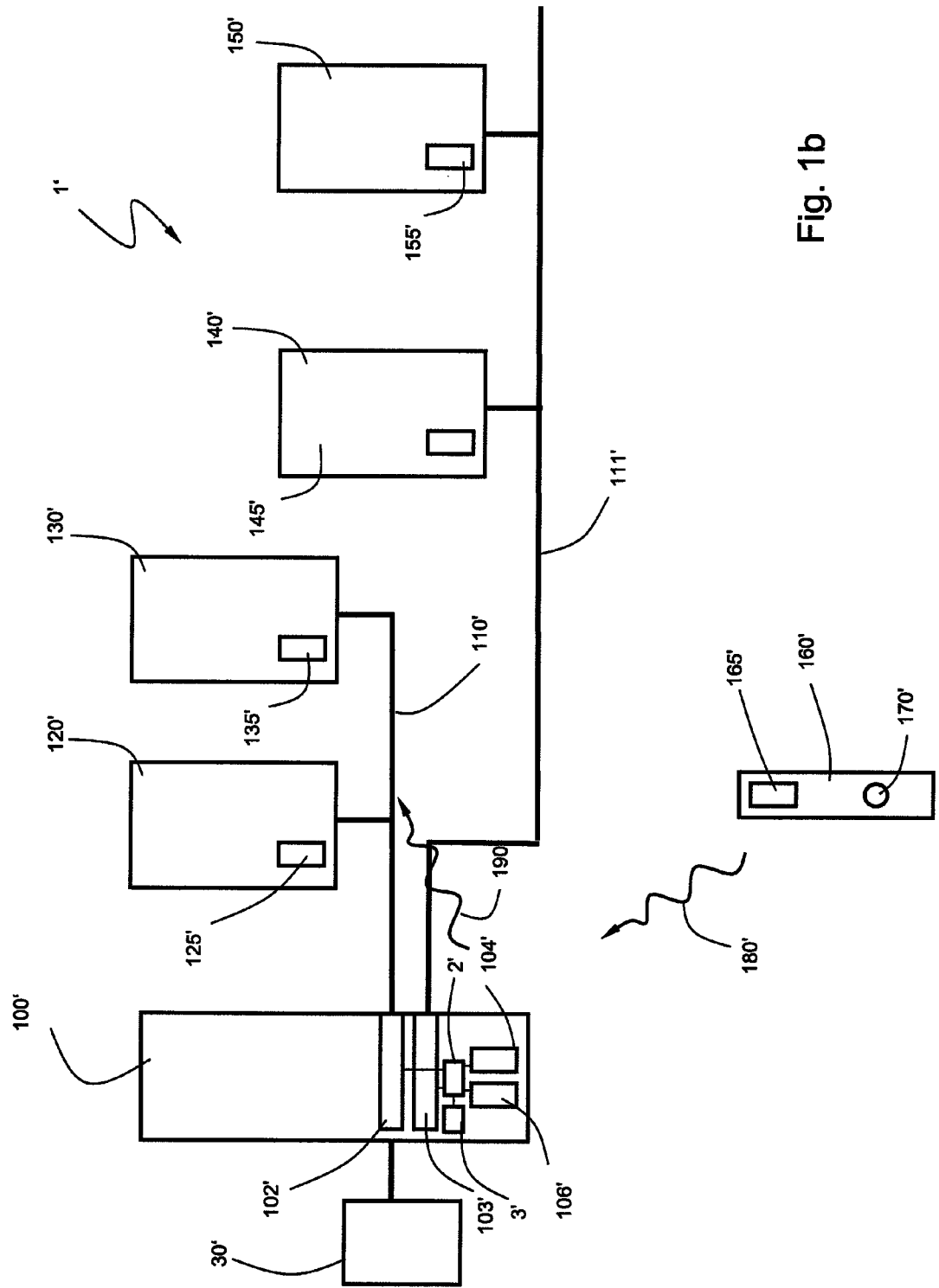

The network 1' of FIG. 1*b* differs from the network 1 of FIG. 1*a* in that the master controller comprises first switching means 102' and second switching means 103' associated respectively with a first group of appliances 120', 130' and a second group of appliances 140', 150'. This network configuration where the master controller 100 contains several switching means is advantageous to connect and disconnect 102 different groups of appliances independently. The receiving means 104' to receive wireless commands, and transmitting means 106' to transmit wireless commands can still be common for the two groups of appliances.

The home automation network according to the invention thus allows wireless control of a plurality of appliances with reduced stand-by power loss thanks to a master controller which can connect and disconnect the plurality of wirelessly controlled appliances from mains power and which can receive and transmit wireless commands.

Normally, e.g. in stand-by mode, the master controller disconnects the plurality of appliances from mains power. When a user sends a control command, the master controller reconnects at least the appliance that is concerned by this command to the mains power then, if necessary, forwards the control command to the appliance, which can then execute the command almost instantaneously.

Figure 2:
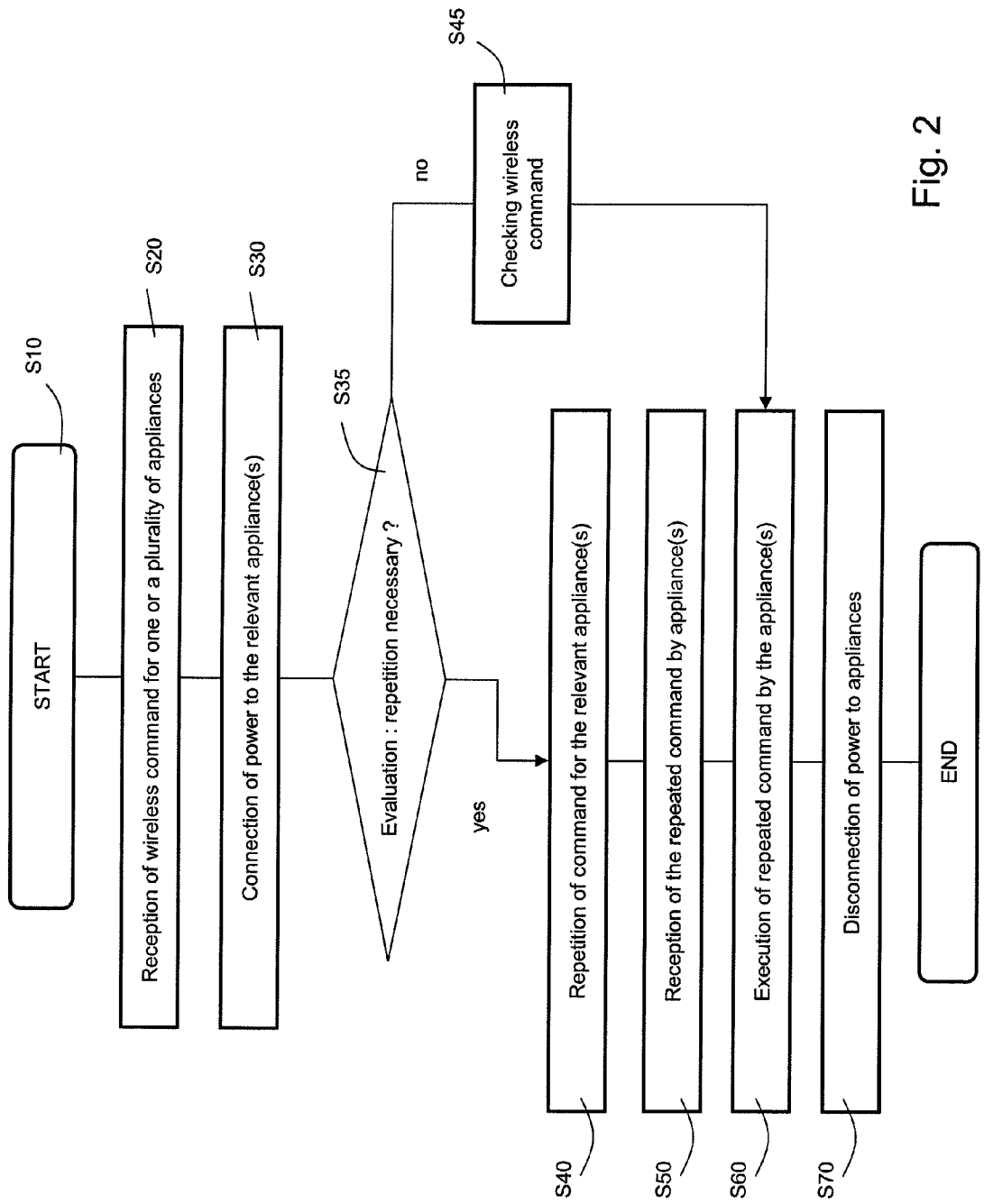

An embodiment of the method according to the invention is described in the flow diagram of FIG. 2. In a stand-by mode (Step S10), characterized by an absence of command and/or an absence of execution of command by one, some or any of the appliances, the master controller controls its switching means such that the plurality of appliances is switched off from mains power.

In a step S20, a wireless command intended for one or a plurality of the appliances is sent though the manual activation means of the wireless control 160 by a user. The command is received and treated by the master controller 20, as all other appliances are unpowered, their receiving means not being active.

The master controller then connects the relevant appliances to the mains power 30 in a step S30. It is imaginable that the master controller is able to control the power connection to each appliance individually or by groups. Consequently, the master controller may only connect the appliance(s) that are concerned by the received command and may leave the other appliances disconnected or the master controller may only connect the concerned group(s) of appliances while leaving the other group(s) of appliances disconnected.

Figure 4:
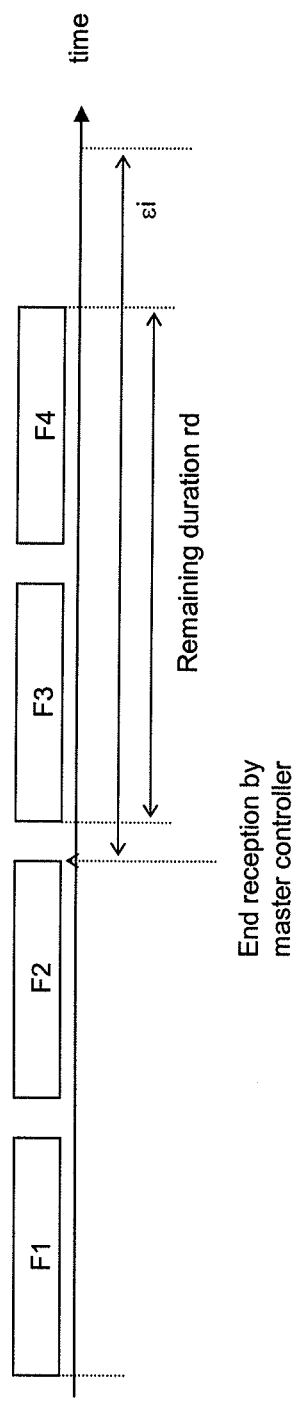

In general, as shown in FIG. 4, a wireless command includes a frame repeated a number of times, in order to ensure that at least one of the frames of the command is received. However, the duration of the command might not be sufficient so that one of the lastly repeated frames is received by the newly awaken appliances. In particular, the time taken for this command to be received and treated by the master controller, added to the reaction time of the appliances as their power is reinstated, might exceed the duration of the first command.

As a consequence, in a step S35, the master controller evaluates whether the command needs to be repeated. In particular when the frames of a command are numbered, the master controller can calculate whether the remaining time of emission of the command is sufficient to be able to be grasped by the newly awaken appliances. A configuration step can be introduced when the home automation network is installed, so that the master controller is aware of the time needed by the appliances to be receptive to a command signal. An example of configuration step is described relative to FIG. 3.

Subsequently in a step S40, whenever needed, the master controller repeats the wireless command 40, which is then received by the concerned appliances 50.

If the master controller estimates that the wireless command can reach the newly powered appliances, it does not retransmit the command, but keeps analyzing the emitted signal in a step S45. In case of interruption of the emitted signal sooner than expected, the master controller is also able to decide whether the message shall be retransmitted.

Upon reception of the command during a step S50, the concerned appliances execute the command in a step S60.

Thereafter in a step S70, the master controller disconnects the appliance(s) or group(s) of appliances from the mains power. The disconnection may follow after a certain period of time. It is advantageous when the master controller is able to estimate the expected time for the execution of the command by the appliance. Then, the time period after which the appliances shall be disconnected from mains power can be adjusted to the actual needs in order to optimize the energy consumption of the appliances. Another alternative to minimize the energy consumption is the use of a feedback from the appliances after execution of the command, e.g. bidirectional wireless communication or powerline communication to the master controller. Another way is linked to the analysis of the current drawn by the appliances; as soon as the appliance completes the execution of the command, it goes back to a standby state, where its energy consumption and thus the current drawn by the appliance, is limited. Then a measurement in the master controller of the current drawn by the appliance(s) allows determining the full execution of a command by the appliance(s).

It is indeed important that the appliances remain powered both for the execution of the command and for the reception of a possible STOP command, although this STOP command could eventually be received with help of the master controller.

Therefore, a user can act exactly as he would do in a conventional home automation network, by simply use the remote control to control one of the appliances. Although in a reduced standby power loss network according to the invention, the appliance does not directly receive the command, as it is completely disconnected from the network, the command is forwarded whenever necessary by the master controller which receives the command, reconnects the power supply to the appliance and repeats the command to the now powered appliance.

The repetition of the user command can be done wirelessly as it has been received or transmitted via other means, such as bus, powerline, or other wired or wireless media.

If the frames include a frame number, the repeated frames may only differ from the original frame by incrementing this frame number.

In an alternative form, the command is repeated wirelessly, but additional information is sent, using wired or wireless medium, to the relevant appliance. This information indicates that the accompanying command is a repetition of a previously sent command. This aspect can be important in the case where the command is of a toggle type (referring only to a change of state). If the appliance receives both the first command and the repeated one, labeling the repeated command may avoid a double change of state resulting in a canceling of the firstly received command.

Figure 3:
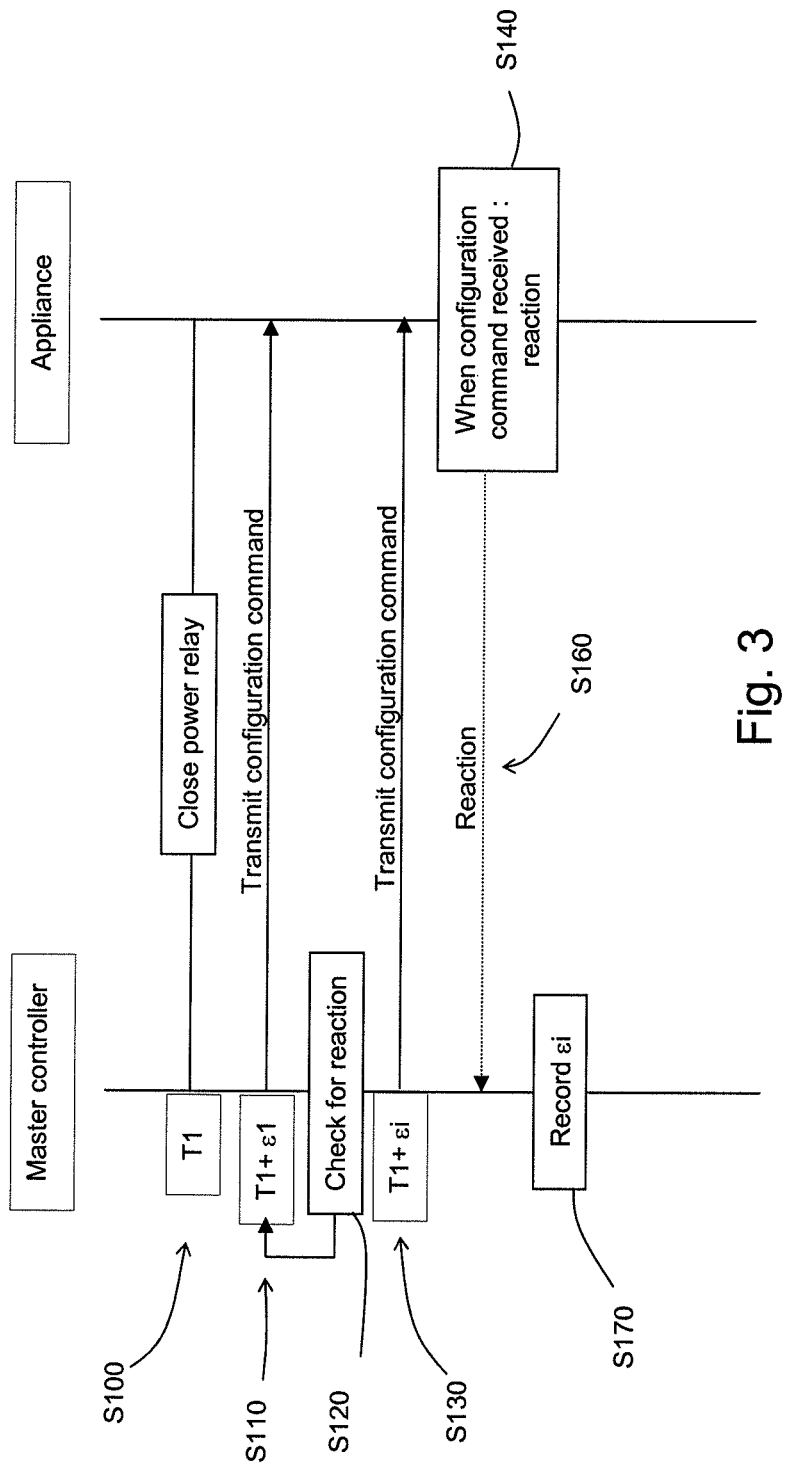

FIG. 3 illustrate a configuration method enabling the master controller to evaluate the reaction time for any appliance following an ON-power switch, after which it is ready to listen to a command signal. This step allows later the master controller to evaluate when a retransmission of the first command is necessary.

In a step S100, at t=T1, the master controller switches ON the power to at least one appliance. In a following step S110, at t=T1+ϵ1, the master controller transmits a configuration message, in a similar way as it would retransmit a received wireless message from a remote controller in a user mode.

It then checks for a reaction until t=T1+ϵ2 in a step 120, then it again transmits a configuration message in a step S130.

Steps 110-130 can be repeated until the appliance receives in a step S140 the configuration message and reacts to it during step S160.

For instance, in case of an appliance containing an electrical motor, the reaction may be a short activation of the motor in two opposite directions and the master controller detects this reaction by means of a current measurement.

The master controller then records in a step 170 the relevant time ϵi at which the corresponding configuration message was sent.

During user mode, when the master controller receives a wireless command and is able to determine the remaining duration rd during which the command is still transmitted and understandable, it compares this remaining duration with the recorded time ϵi. When the remaining duration is bigger than the recorded time, the master controller does not retransmit the command, but keeps analyzing the emitted signal. In case of interruption of the emitted signal sooner than expected, the master controller is also able to decide whether the message shall be retransmitted.

Advantageously, the master controller is included in an electric board of a building equipped with the home automation network. For instance, the master controller is contained in a DIN-case equipped with DIN-rail fixation means.

It should be noted that the invention also relates to a method for operating a master controller controlling a group of wirelessly controlled appliances, characterized in that it comprises:
- a reception step in which the master controller receives a wireless command intended for an appliance of the group, then
- a connection step in which the master controller connects the appliance to mains power, if the appliance was previously disconnected from the mains power, then
- if necessary, a transmission step in which the master controller retransmits the wireless command to the appliance.

Various embodiments of this method may include the features of claims 2 to 9.

In a variant of the method, the master controller will systematically repeat any command sent while the appliance was disconnected, whereas a new command will not be repeated when the appliance has been already connected due to a previous command. In that case, the evaluation step S35 analyses whether or not the appliance has been already connected during a sufficient lapse of time.

The present invention has been described on the basis of a preferred practical example thereof. Obviously, many modifications and variations of the present invention are possible in the light of the above teachings.

In a preferred embodiment the master controller does not implement (or activate) the method permanently, so that the reaction time between a command and its execution will not be affected by the method when a short reaction time is preferred. In a first variant, the master controller will not activate the method during daily-defined periods. The daily-defined periods may be predetermined or set by a user (as 7:00 am to 9:00 am and 6:00 pm to 8:00 pm). Preferably, the daily-defined periods are "learned" by the master controller from the history of commands sent during the last days, indicating when these commands happen as numerous. In that case, the method will not be activated during these periods (taking a margin before and after). This means that the master controller will leave the appliances connected during these periods.

In this first variant, a clock is included in the logic-processing unit 2 of the master controller.

In a second variant, the master controller will not activate the method during short periods immediately following a significant change in environmental or climatic conditions, for instance a change in sun illumination sensed by a light sensor. Such change will usually lead to new commands sent by the user in case of solar protection type appliances. A short period is for instance 10 minutes, during which the master control will leave the appliances connected. Environmental conditions may be movement(s) of the user, detected by a presence sensor.

In this second variant, a sensor interface (as an analog-to-digital converter) is included in the logic-processing unit 2 of the master controller.

Both variants may be combined to give a better comfort for the user and to reduce as much as possible the periods during which the method is not activated.

It should therefore be understood that, within the scope of the appended claims, the present invention may be practiced otherwise than as specifically described. In particular, individual characteristics of the invention can be employed individually or in combination one with the other.

In the instant application, "the appliance is automatically disconnected from mains power" means that the appliance is disconnected from mains power without an action of the user, especially without an action of the user on a remote control unit controlling the appliance(s) and/or the master controller.

The invention claimed is:

1. A method for controlling a group of wirelessly controlled appliances comprising one or more appliances, each one of said one or more appliances of the group being supplied with power from mains power through at least one cable and being controllable by one or more wireless remote controls, each wireless remote control having a transmitter for transmitting wireless commands, in a home automation network comprising a master controller, wherein
   a wireless remote control sends a wireless command intended to control a concerned appliance of the group while said concerned appliance is disconnected from the mains power and its receiving means are inactive,
   the master controller receives, by means of receiving means of the master controller, the wireless command, in a reception step, then, based on the reception step,
   the master controller, which comprises a switching means that is configured to open or close a connection between said at least one cable linked to said concerned appliance and the mains power, connects the concerned appliance to mains power, in a connection step then the master controller evaluates whether the wireless command needs to be repeated by determining whether a sum of a time for the wireless command to be received and treated by the master controller and a reaction time of the concerned appliance as power to the concerned appliance is reinstated exceeds a duration of the sending of the wireless command, in a determination step, and, in response to determining the sum exceeds the duration, the master controller retransmits the wireless command to said concerned appliance, in a repetition step, then
   the master controller, making use of said switching means, automatically disconnects the appliance from mains power in a disconnection step.

2. The method according to claim 1, wherein, in the determination step, the master controller determines whether the concerned appliance can receive the wireless command.

3. The method according to claim 2, wherein the master controller evaluates the remaining duration (rd) of transmission of the wireless command and compares the remaining duration to a previously determined reaction time ($\epsilon i$) of the concerned appliance after connection to mains power.

4. The method according to claim 1, wherein the disconnection step performed by the master controller is caused by the passage of a determined time period after the connection step.

5. The method according to claim 4, wherein the duration of the determined time period is determined by analysis of the wireless command by the master controller.

6. The method according to claim 1, wherein the disconnection step is triggered by a feedback received by the master controller and provided by the concerned appliance upon execution of the wireless command.

7. The method according to claim 1, wherein the disconnection step is triggered by analyzing the current drawn by the concerned appliance.

8. The method according to claim 1, wherein the master controller analyses the wireless command in order to connect to the mains power only a minimal number of appliances including the concerned appliance.

9. A master controller for controlling a group of wirelessly controlled appliances comprising at least one appliance, wherein the master controller comprises switching means to connect the at least one wirelessly controlled appliance to mains power and disconnect the at least one wirelessly controlled appliance from the mains power, a receiving means to receive a wireless command, a transmitting means to transmit the wireless command and hardware and software means to implement the method according to claim 1.

10. The master controller according to claim 9, wherein said switching means include intensity measurement means.

11. The master controller according to claim 9, wherein it includes means to deactivate during daily periods and/or immediately after a change in environmental conditions.

12. A home automation network comprising:
   a group of wirelessly controlled appliances comprising one or more wirelessly controlled appliances, each one of said one or more appliances of the group being supplied with power from mains power through at least one cable and being controllable by one or more wireless remote controls, each wireless remote control having a transmitter for transmitting wireless commands; and
   a master controller for controlling said group of wirelessly controlled appliances, wherein the master controller comprises:
   switching means to connect the at least one wirelessly controlled appliance to the mains power and disconnect the at least one wirelessly controlled appliance from the mains power,
   a receiving means of the master controller to receive a wireless command,
   a transmitting means to transmit the wireless command, and
   hardware and software means adapted to implement a method of controlling said group of wirelessly controlled appliances, the method comprising the following steps:
      receiving, by the receiving means of the master controller, a wireless command intended for a concerned appliance of the group while said concerned appliance is disconnected from the mains power and receiving means of the concerned appliance is inactive;
      connecting, by the master controller, making use of said switching means, the concerned appliance to mains power, if the concerned appliance was previously disconnected from the mains power;
      determining, by the master controller, whether the wireless command needs to be repeated by determining whether a sum of a time for the wireless command to be received and treated by the master controller and a reaction time of the concerned appliance as power to the concerned appliance is reinstated exceeds a duration of transmission of the wireless command by the one or more wireless remote controls and, in response to determining the sum exceeds the duration, retransmitting, by the master controller, the wireless command to said concerned appliance; and
      automatically disconnecting, by the master controller, making use of said switching means, the concerned appliance from mains power.

13. A method for configuring the operation of a master controller controlling a wirelessly controlled appliance, said wirelessly controlled appliance being supplied with power from mains power through at least one cable and being controllable by one or more wireless remote controls, each wireless remote control having a transmitter for transmitting a wireless command to the wirelessly controlled appliance, wherein the method comprises the following steps:
   a reception step in which the master controller receives, by means of receiving means, a wireless command to control a concerned appliance of the group while said concerned appliance is disconnected from the mains power and receiving means of the concerned appliance are inactive, a connection step in which the master controller includes a switching means configured to open or close a connection between said at least one cable linked to said concerned appliance and the mains power, the master controller connecting the concerned appliance to mains power, the concerned appliance being previously disconnected from the mains power, a determination step in which the master controller evaluates whether the wireless command needs to be repeated by determining whether a sum of a time for the wireless command to be received and treated by the master controller and a reaction time of the concerned appliance as power to the concerned appliance is reinstated exceeds a duration of transmission of the wireless command by the one or more wireless remote controls, a transmission step in which the master controller transmits, in response to determining the sum exceeds the duration, a signal to the concerned appliance, a detection step in which the master controller detects a reaction of the concerned appliance, and a determination step in which the master controller determines the duration between the connection step and the detection step.

* * * * *